United States Patent
Yang et al.

(10) Patent No.: US 12,413,067 B2
(45) Date of Patent: Sep. 9, 2025

(54) RAPID TURNOFF METHOD, PHOTOVOLTAIC ASSEMBLY TURNOFF DEVICE, AND PHOTOVOLTAIC SYSTEM

(71) Applicant: Sungrow Power Supply Co., Ltd., Hefei (CN)

(72) Inventors: Yu Yang, Hefei (CN); Yanfei Yu, Hefei (CN); Xinyu Wang, Hefei (CN); Jun Xu, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 456 days.

(21) Appl. No.: 17/915,396

(22) PCT Filed: Mar. 8, 2021

(86) PCT No.: PCT/CN2021/079465
§ 371 (c)(1),
(2) Date: Sep. 28, 2022

(87) PCT Pub. No.: WO2021/208632
PCT Pub. Date: Oct. 21, 2021

(65) Prior Publication Data
US 2023/0126969 A1    Apr. 27, 2023

(30) Foreign Application Priority Data
Apr. 16, 2020  (CN) .......................... 202010297765.1

(51) Int. Cl.
*H02H 7/20*  (2006.01)
*H02H 1/00*  (2006.01)

(52) U.S. Cl.
CPC ............ *H02H 7/20* (2013.01); *H02H 1/0007* (2013.01)

(58) Field of Classification Search
CPC .......... H02H 3/027; H02H 3/093; H02H 7/20; H02H 1/0007
See application file for complete search history.

(56) References Cited

U.S. PATENT DOCUMENTS 9,496,710 B2 * 11/2016 Narla ...................... H02J 3/388
10,038,317 B1   7/2018 McCracken et al.
(Continued)

FOREIGN PATENT DOCUMENTS

CN    103457238 A    12/2013
CN    105606935 A     5/2016
(Continued)

OTHER PUBLICATIONS

International Search Report and Written Opinion for International Application No. PCT/CN2021/079465, mailed May 21, 2021.
(Continued)

*Primary Examiner* — Thienvu V Tran
*Assistant Examiner* — Christopher J Clark
(74) *Attorney, Agent, or Firm* — Wolf, Greenfield & Sacks, P.C.

(57) ABSTRACT

A photovoltaic assembly turnoff device, and a photovoltaic system. The rapid turnoff method includes: after receiving a start signal, a photovoltaic assembly turnoff device controls itself to be turned on, so that a photovoltaic assembly connected thereto achieves electric energy output; then, the photovoltaic assembly turnoff device can measure a state parameter thereof to determine whether a corresponding inverter channel in a photovoltaic system has a fault; if the corresponding inverter channel in the photovoltaic system has the fault, control the photovoltaic assembly turnoff device to be turned off, so that the photovoltaic assembly connected thereto stops the electric energy output; if the corresponding inverter channel in the photovoltaic system
(Continued)

has no fault, always keep the photovoltaic assembly turnoff device to be turned on.

16 Claims, 10 Drawing Sheets

(56) References Cited

U.S. PATENT DOCUMENTS

| | | | | |
|---|---|---|---|---|
| 11,342,787 | B2* | 5/2022 | Pauletti | ............ H02J 13/00006 |
| 2009/0141522 | A1 | 6/2009 | Adest et al. | |
| 2017/0207620 | A1 | 7/2017 | Zhu et al. | |
| 2021/0194235 | A1* | 6/2021 | Koga | .................... G01R 31/16 |

FOREIGN PATENT DOCUMENTS

| | | |
|---|---|---|
| CN | 106981881 A | 7/2017 |
| CN | 106992540 A | 7/2017 |
| CN | 108270398 A | 7/2018 |
| CN | 108539789 A | 9/2018 |
| CN | 109617523 A | 4/2019 |
| CN | 111478290 A | 7/2020 |
| WO | 2010/078303 A2 | 7/2010 |

OTHER PUBLICATIONS

Extended European Search Report for European Application No. 21789183.7, dated Mar. 19, 2024.

* cited by examiner

RAPID TURNOFF METHOD, PHOTOVOLTAIC ASSEMBLY TURNOFF DEVICE, AND PHOTOVOLTAIC SYSTEM

This application is a national stage filing under 35 U.S.C. § 371 of International Patent Application Serial No. PCT/CN2021/079465, filed Mar. 8, 2021, which claims the priority to Chinese Patent Application No. 202010297765.1 titled "RAPID SHUTDOWN METHOD, SHUTDOWN DEVICE FOR PHOTOVOLTAIC MODULE, AND PHOTOVOLTAIC SYSTEM", filed on Apr. 16, 2020 with the China National Intellectual Property Administration. The contents of these applications are incorporated herein by reference in their entireties.

FIELD

The present disclosure relates to the technical field of photovoltaic grid-connected power generation, and in particular to a rapid shutdown method, a shutdown device for a photovoltaic module, and a photovoltaic system.

BACKGROUND

Photovoltaic power is renewable energy, and hence photovoltaic power generation technology is widely applied. A direct current is outputted from a photovoltaic array and then converted into an alternating current power by an inverter, and the alternating current power is transmitted to a power grid. A high voltage is outputted by serial-connected photovoltaic arrays, and hence a photovoltaic system should be capable of being rapidly shut down in order to ensure its safety. In conventional technology, a shutdown device is usually provided for a photovoltaic module, such that an on/off state of the shutdown device can control whether the photovoltaic module outputs power.

In conventional technology, a central controller of the photovoltaic system transmits a continuous heartbeat signal or periodic excitation pulses to maintain each shutdown device of the photovoltaic modules in the on-state. The continuous heartbeat communication signal and the periodic excitation pulses occupies a large amount of software resources in the central controller, and enhances a power consumption.

SUMMARY

In view of the above, a rapid shutdown method, a shutdown device for a photovoltaic module, and a photovoltaic system are provided according to embodiments of the present disclosure. Hence, less software resources of a central controller are occupied, and power consumption of the central controller is reduced.

In a first aspect, a rapid shutdown method is provided. The rapid shutdown method includes: receiving a starting signal by a shutdown device in a photovoltaic system, where the shutdown device is for a photovoltaic module; controlling, by the shutdown device, the shutdown device to be turned on, where the shutdown device being on enables the photovoltaic module connected to the shutdown device to output power; determining, by the shutdown device, whether there is a fault in an inverter channel of the photovoltaic system through detecting a status parameter of the shutdown device, where the inverter channel corresponds to the shutdown device; controlling, by the shutdown device, the shutdown device to be turned off in a case that there is the fault in the inverter channel, where the shutdown device being off stops the photovoltaic module connected to the shutdown device outputting power; and maintaining, by the shutdown device, the shutdown device being on, in a case that there is no fault in the inverter channel.

In an embodiment, determining, by the shutdown device, whether there is the fault in the inverter channel in the photovoltaic system includes: determining, by the shutdown device, whether the status parameter is subject to dynamic variations; determining that there is the fault in the inverter channel in a case that the status parameter is subject to the dynamic variations; and determining that there is no fault in the inverter channel in a case that the status parameter is not subject to dynamic variations.

In an embodiment, determining, by the shutdown device, whether there is the fault in the inverter channel in the photovoltaic system includes: determining, by the shutdown device according to the status parameter, whether there is an arc flash on a direct-current bus corresponding to the shutdown device; determining, by the shutdown device, that there is the fault in the inverter channel in a case that there is the arc flash on the direct-current bus; and determining, by the shutdown device, that there is no fault in the inverter channel in a case that there is no arc flash on the direct-current bus.

In an embodiment, receiving the starting signal by the shutdown device in the photovoltaic system includes: receiving, by the shutdown device, the starting signal during a starting period of the shutdown device or during a fault-recovery period of an inverter.

In an embodiment, the starting signal is received during the starting period of the shutdown device, and before the shutdown device controlling the shutdown device to be turned on, the method further includes: determining, by the shutdown device, whether the inverter is operating through detecting an output current of the shutdown device, after the shutdown device is powered by an assistant power supply; and controlling, by the shutdown device, the shutdown device to be turned on in a case that the inverter is operating and the shutdown device receives the starting signal.

In an embodiment, before controlling, by the shutdown device, the shutdown device to be turned off, the method further includes: determining, by the shutdown device, whether duration for which the fault in the inverter channel lasts reaches preset duration; performing the step of controlling, by the shutdown device, the shutdown device to be turned off, in a case that the duration for which the fault lasts reaches the preset duration.

In an embodiment, the preset duration is longer than a timestep for maximum power point tracking of the inverter in the photovoltaic system, and is shorter duration required for rapid shutdown of the photovoltaic system.

In an embodiment, the rapid shutdown method further includes: introducing, by the inverter in the photovoltaic system, voltage fluctuations onto a direct-current bus in the photovoltaic system to change the status parameter of the shutdown device. Thereby, it is prevented that the shutdown device performs erroneous shutdown.

In a second aspect, a shutdown device for a photovoltaic module is provided. The shutdown device includes a switching unit, a bypass diode, a driving unit, a parameter collecting module, a processor, and a starting signal receiving unit; where: the parameter collecting module is configured to collect a status parameter of the shutdown device and report the collected status parameter to the processor; the starting signal receiving unit is configured to receive a starting signal and transmit the starting signal to the processor; the switching unit is connected in a positive branch or a negative branch of the shutdown device, and is configured to turn on and turn off the shutdown device under control of the processor; the bypass diode is configured to implement a bypass of the shutdown device when the shutdown device is turned off; an output terminal of the processor is connected to a control terminal of the switching unit via the driving unit; and the processor is configured to coordinate with the starting signal receiving unit, the parameter collecting module, the driving unit, and the switching unit to enable the shutdown device to perform the foregoing rapid shutdown method in the first aspect.

In an embodiment, the parameter collecting module includes a voltage sampling unit and at least one current sampling unit, where the voltage sampling unit is configured to collect an input voltage of the shutdown device and report the collected input voltage to the processor, and each current sampling unit is configured to collect an input current or an output current of the shutdown device and report the collected input current or the collected output current to the processor.

In an embodiment, the starting signal receiving unit is connected in the negative branch of the shutdown device, and between an anode of the bypass diode and a negative output terminal of the shutdown device; in a case that a quantity of the at least one current sampling unit is one, the current sampling unit is connected in the positive branch of the shutdown device and between a cathode of the bypass diode and a positive output terminal of the shutdown device, or is connected in the negative branch of the shutdown device and between the anode of the bypass diode and the starting signal receiving unit; in a case that a quantity of the at least one current sampling unit is two and the at least one current sampling unit includes a first current sampling unit and a second current sampling unit, the first current sampling unit is connected in the negative branch of the shutdown device and between a negative input terminal of the shutdown device and the starting signal receiving unit, and the second current sampling unit is connected between the anode of the bypass diode and a common terminal between the first current sampling unit and the starting signal receiving unit.

In a third aspect, a photovoltaic system is provided. The photovoltaic system includes at least one shutdown system and at least one inverter, and each shutdown system includes a direct-current bus, a starting signal generator, N photovoltaic macro-modules, and N forgoing shutdown devices in the second aspect, and N is a positive integer; where in each shutdown system: the N shutdown devices are cascaded via output terminals of the N shutdown devices and are connected to the N photovoltaic macro-modules in a one-to-one correspondence via input terminals of the N shutdown devices, a positive terminal of the cascaded shutdown devices is connected to a positive terminal of a corresponding direct-current interface of an inverter of the at least one inverters via a positive line of the direct-current bus, a negative terminal of the cascaded shutdown devices is connected to a negative terminal of the direct-current interface of the inverter via a negative line of the direct-current bus; and the starting signal generator is configured to transmit a starting signal to each shutdown device in the same shutdown system as the starting signal generator.

In an embodiment, the starting signal generator, which is configured to transmit the starting signal to each shutdown device in the same shutdown system as the starting signal generator, is configured to: transmit the starting signal successively to each shutdown device in the same shutdown system as the starting signal generator during a starting period of said shutdown device or during a fault-recovery period of the inverter until the inverter enters a normal operating state.

In an embodiment, the at least one inverter is configured to introduce voltage fluctuations onto the direct-current bus to change a status parameter of each shutdown device corresponding to the direct-current bus to prevent the shutdown device for performing erroneous shutdown.

In an embodiment, the starting signal is a power-line-carrier signal, a wireless communication signal, or an analog pulse signal.

In an embodiment, the starting signal is the power-line-carrier signal, and complies with a rapid shutdown signal specification issued by SunSpec Alliance.

In an embodiment, the starting signal generator is integrated in the inverter, or is independently connected in the direct-current bus.

Hereinabove the rapid shutdown method is provided according to embodiments of the present disclosure. The shutdown device for the photovoltaic module controls itself to be turned on after receiving the starting signal, such that the photovoltaic module connected to the shutdown device outputs power. Then, the shutdown device determines whether there is the fault in the inverter channel, which corresponds to the shutdown device, in the photovoltaic system through detecting the status parameter of the shutdown device. The shutdown device controls itself to be turned off in a case that there is the fault in the inverter channel, such that the photovoltaic module stops outputting power. The shutdown device maintains itself being on in a case that there is no fault in the inverter channel. Therefore, it is not necessary that a central controller transmit successive signals or pulses to control the shutdown device to be on. Less software resources of the central controller are occupied, and power consumption of the central controller is reduced.

DETAILED DESCRIPTION

Hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

The terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . ." does not exclude the case that other similar elements may exist in the process, the method, the article or the device other than enumerated elements.

A rapid shutdown method is provided according to an embodiment of the present disclosure. Addressed is an issue that a central controller in a conventional system needs to transmit a continuous heartbeat signal or periodic excitation pulses to maintain each shutdown device being in an on-state, which occupies a lot of software resources and raises power consumption of the central controller.

Figure 1:
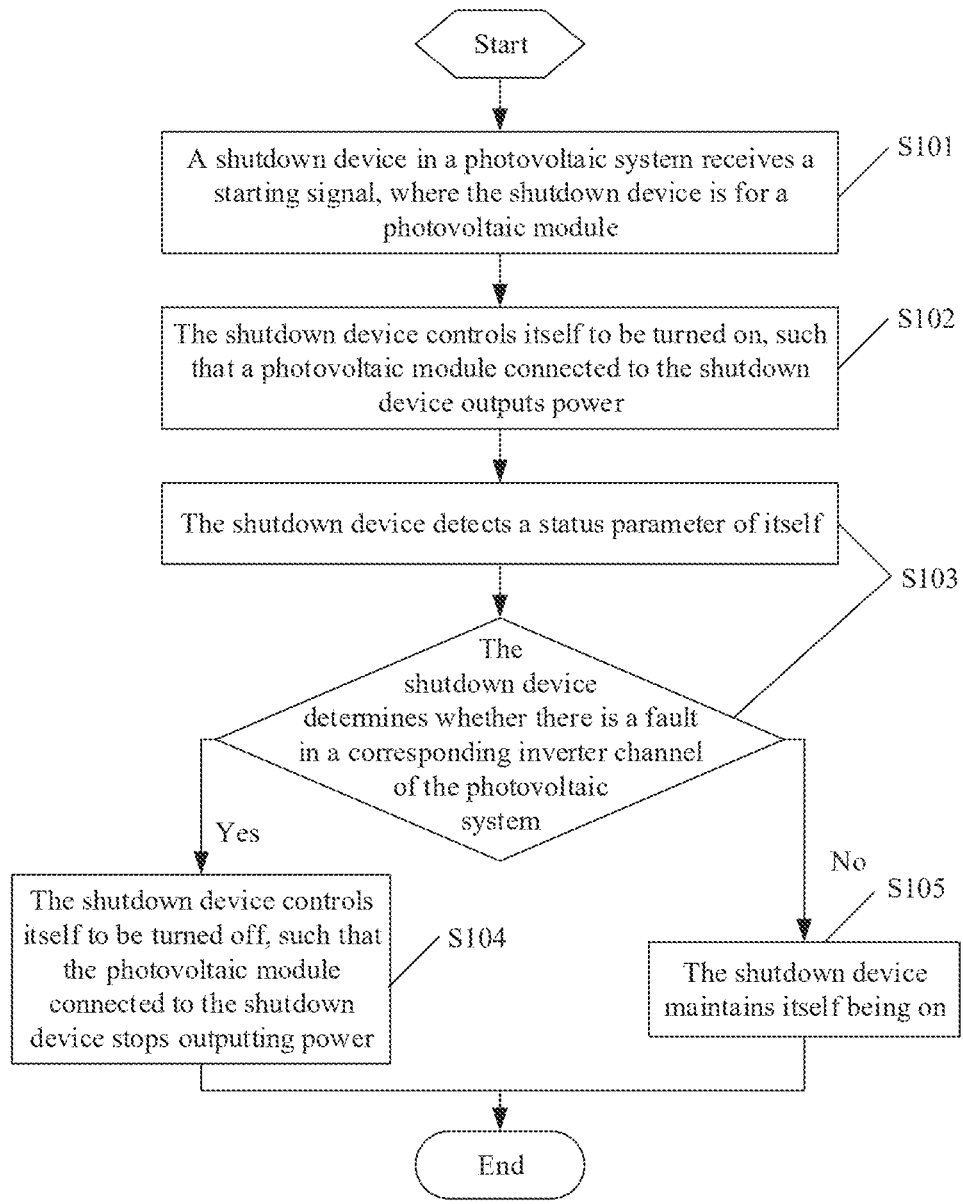
FIG. 1 is a flow chart of a rapid shutdown method according to an embodiment of the present disclosure.

As shown in FIG. 1, the rapid shutdown method includes following steps S101 to S105.

In step S101, a shutdown device in a photovoltaic system receives a starting signal, where the shutdown device is for a photovoltaic module.

The starting signal is generated and transmitted by a device out of the shutdown device, such as a starting signal generator. The starting signal may be a power-line-carrier signal, a wireless communication signal, or an analog pulse signal, which is not limited herein. All implementations fall within the protection scope of the present disclosure.

In practice, SunSpec Alliance is a trade alliance formed by more than 100 participants in the industry of solar energy and distributed-storage energy. SunSpec specifications issued by the SunSpec alliance are worldwide and applies to most components in solar photovoltaic systems. The SunSpec specifications specify universal power line carrier communication signals for rapid shutdown devices. Therefore, in a case that the starting signal is the power carrier signal, the starting signal may comply with the SunSpec specifications that concern rapid shutdown signals, which improves circuitry compatibility.

In practice, the shutdown device may receive the starting signal during a starting period of the shutdown device or a fault-recovery period of an inverter. That is, a device generating and transmitting the starting signal, such as the starting signal generator, transmits the starting signal during the starting period of the shutdown device or the fault-recovery period of the inverter.

The shutdown device receiving the starting signal indicates that the inverter connected to the shutdown device permits the shutdown device to enter an operating state, that is, permits the step S102 to be performed.

In practice, there may be a photovoltaic module which cannot output a voltage due to being shaded in the photovoltaic system, and hence no assistant power is provided to the shutdown device connected to such photovoltaic module. The starting signal may be received during the starting period of the shutdown device when the shutdown device does not have the assistant power. In such case, the shutdown device cannot be started due to a lack of the assistant power, and hence cannot control itself to be turned on. Therefore, the shutdown device needs to wait for the assistant power before performing the step S102. In addition, there is a possibility that the starting signal is not transmitted in a successive manner. Hence, in a case that the starting signal is received when the shutdown device has no assistant power during the starting period of the shutdown device, the shutdown device would detect an output current of itself after receiving the starting signal and has the assistant power, and determines accordingly whether the inverter in the photovoltaic system is in an operating state. The shutdown device performs step S102 in a case that the inverter is in the operating state.

In step S102, the shutdown device controls itself to be turned on, such that a photovoltaic module connected to the shutdown device outputs power.

It should be noted that turning on the shutdown device is different from implementing a communication function. Turning on the shutdown device refers to that the shutdown device establishes a connection in itself to enable the photovoltaic module connected to the shutdown device to output power. The shutdown device may be capable to implement the communication function as long as the shutdown device is powered, i.e., has the assistant power.

After the shutdown device is turned on, there is a status parameter, that is, an input/output parameter, o. In such case, the step S103 is performed.

In step S103, the shutdown device detects a status parameter of itself to determine whether there is a fault in an inverter channel of the photovoltaic system, where the inverter channel corresponds to the shutdown device.

The status parameter may be an input parameter, such as an input voltage (that is, a voltage outputted by the corresponding photovoltaic module) or an input current (that is, a current outputted by the corresponding photovoltaic module). The status parameter may alternatively be an output parameter, such as an output current or an output voltage.

The fault in the inverter channel includes short circuit on a direct-current interface of the inverter, short circuit on a direct-current bus, and an arc flash on the direct-current bus. In a case that any above fault occurs in the inverter channel, the inverter cannot operate normally and there is a safety risk in circuitry.

Therefore, the photovoltaic module needs to stop outputting power, that is, the process goes to step S104, in a case that there is the fault in the inverter channel corresponding to the shutdown device. The photovoltaic module continues outputting power, that is, the process goes to step S105, in a case that there is no fault in the inverter channel corresponding to the shutdown device.

In step S104, the shutdown device controls itself to be turned off, such that the photovoltaic module connected to the shutdown device stops outputting power.

In step S105, the shutdown device maintains itself being on.

In this embodiment, the shutdown device may enter an on-state on receiving the starting signal. Then, the shutdown device detects the status parameter of itself to determine whether to maintain itself in the on-state. It is not necessary that a central controller transmits successive signals or pulses to control the shutdown device to be in the on-state, and the starting signal is not necessary after the shutdown device has already been turned on. Thereby, less software resources are occupied and power consumption is reduced in the central controller.

Some scenarios require that the inverter has the fault-recovery period, which generally ranges from tens of seconds to a few minutes. The fault-recovery period is longer than rapid shutdown duration required by the system, such as 30 seconds specified in the standard NEC 2017. After each photovoltaic module in the photovoltaic system outputs power, a direct-current input voltage of the inverter in the photovoltaic system is normal, and an undervoltage input fault disappears. In such case, before starting operation, the inverter needs to wait for the fault-recovery period, during which the photovoltaic module is open-circuit. In order to maintain the direct-current input voltage being normal, the starting signal generator needs to transmit the starting signal(s) successively to the shutdown device during the fault-recovery period. That is, the shutdown device keeps receiving the starting signal(s) during the fault-recovery period.

Therefore, in practice, the process further includes a following step before step S104. The shutdown device determines whether duration, for which the fault in the inverter channel corresponding to the shutdown device lasts, reaches preset duration, i.e., reaches duration of the fault-recovery period. In a case that duration for which the fault in the inverter channel lasts reaches the preset duration, the process goes to the step S104. That is, the shutdown device controls itself to be turned off, such that the photovoltaic module connected to the shutdown device stops outputting power. The preset duration is the rapid shutdown duration, and is longer than a timestep for maximum power point tracking of the inverter in the photovoltaic system while is shorter than duration of the fault-recovery duration of the photovoltaic system.

The fault in the inverter channel may have different causes. Correspondingly, the step 103 may concern different processes of determining whether there is the fault in the inverter channel corresponding to the shutdown device. Specifical processes may be as follows.

Figure 2:
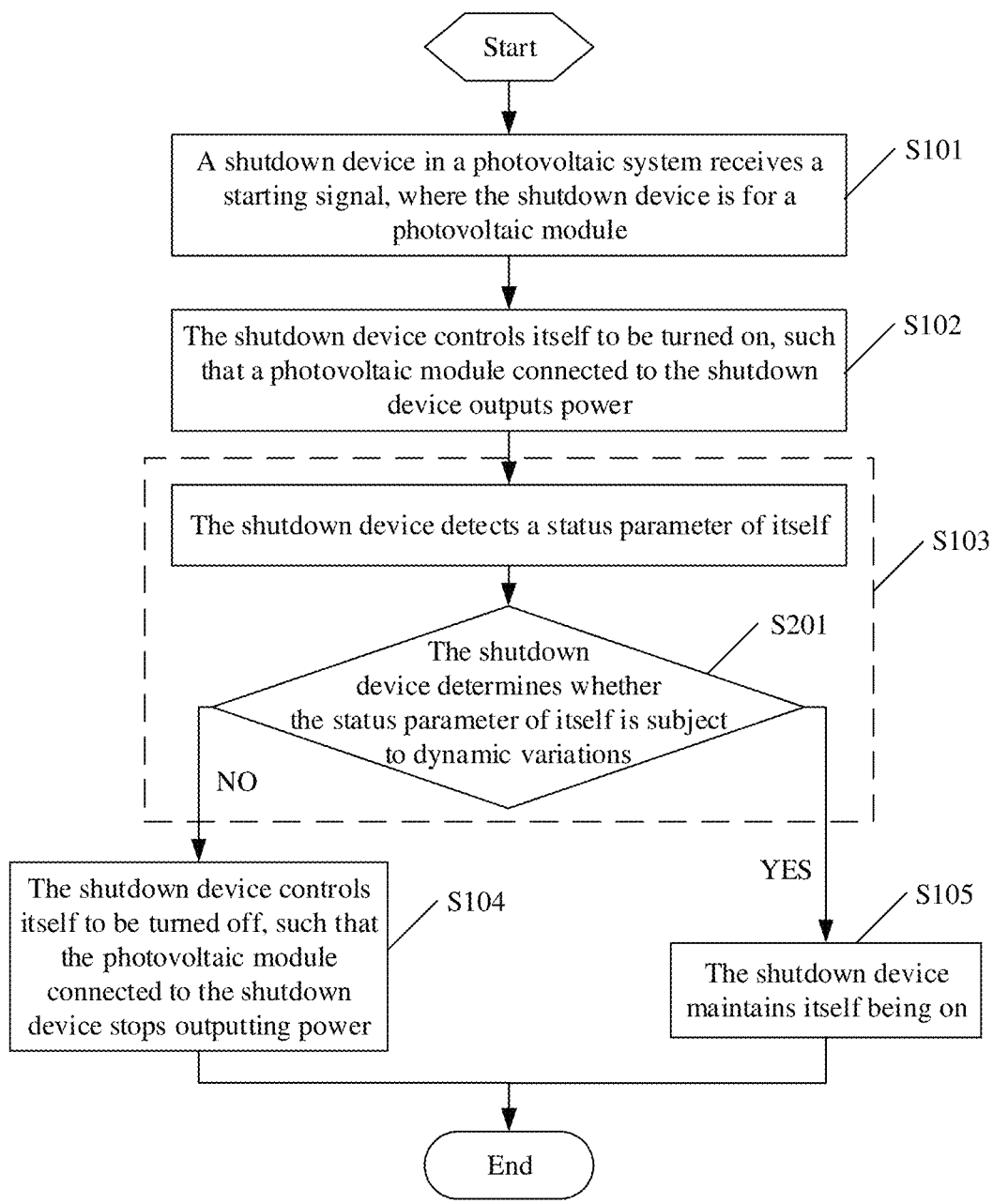
FIG. 2 is a flow chart of a rapid shutdown method according to another embodiment of the present disclosure.

(1) In practice, a short circuit on a direct-current bus or on a direct-current interface corresponding to an inverter may be detected in the inverter channel. The step S103 includes following step S201, as shown in FIG. 2.

In step S201, the shutdown device determines whether the status parameter of itself is subject to dynamic variations.

In a case that the status parameter is the input current or the input voltage, it is determined whether the input current or the input voltage is subject to dynamic variations. In a case that the status parameter is the output current or the output voltage, it is determined whether the input current or the input voltage is subject to dynamic variations.

Whether the status parameter is subject to dynamic variations may be determined through comparing a previous sampling value with a current sampling value. For example, it is determined that the status parameter is subject to dynamic variations in a case that the previous sampling value is different from the current sampling value, and it is determined that the status parameter is not subject to dynamic variations in a case that the previous sampling value is identical to the current sampling value. Alternatively, whether the status parameter is subject to dynamic variations is determined based on whether a quantity of successive events, in each of which the previous sampling value is identical to the current sampling value, is greater than or equal to a preset value. It is determined that the status parameter is not subject to dynamic variations in a case that the quantity of the successive events is greater than or equal to the preset value, and it is determined that the status parameter is subject to dynamic variations in a case that the quantity of the successive events is less than the preset value.

Herein an implementation of the step 201 is not limited and depends on an actual situation. All implementations fall within the protection scope of the present disclosure. The status parameter is not limited to the input current, the input voltage, the output current, and the output voltage, and other parameters that can characterize an input or an output of the shutdown device all fall within the protection scope of the present disclosure.

The inverter in the photovoltaic system adjusts dynamically a voltage and a current on the direct-current bus of the photovoltaic system to perform maximum power point tracking, so as to maximize an output power of each photovoltaic module corresponding to the direct-current bus. Therefore, the voltage and the current of the direct-current bus would be subject to dynamic variations when there is no fault in the inverter channel, and accordingly the status parameter of the shutdown device corresponding to the direct-current bus is subject to dynamic variations. That is, the maximum power point tracking is capable to introduce successive fluctuations into an output of each photovoltaic modules, and such fluctuations are an inherent characteristic of normal operation of the inverter. The shutdown device may determine whether is a fault by using such inherent characteristic. In addition, the inverter may adjust the voltage and the current of the direct-current bus actively during a constant-power mode, that is, when the inverter does not perform the maximum power point tracking. Thereby, the status parameter of the shutdown device is further subject to dynamic variations in order to prevent the shutdown device from performing erroneous shutdown. Hence, when the shutdown device determines that the status parameter of the shutdown device is not subject to dynamic variations, it indicates that a current state of the inverter channel does not conform with the characteristic of normal operation. Thereby, the shutdown device may determine that there is the fault in the inverter channel corresponding to the shutdown device, and performs the step S104. When the shutdown device determines that the status parameter of the shutdown device is subject to dynamic variations, it indicates that the current state of the inverter channel conforms with the characteristic of normal operation. Thereby, the shutdown device may determine that there is no fault in the inverter channel corresponding to the shutdown device, and performs the step S105.

Figure 3:
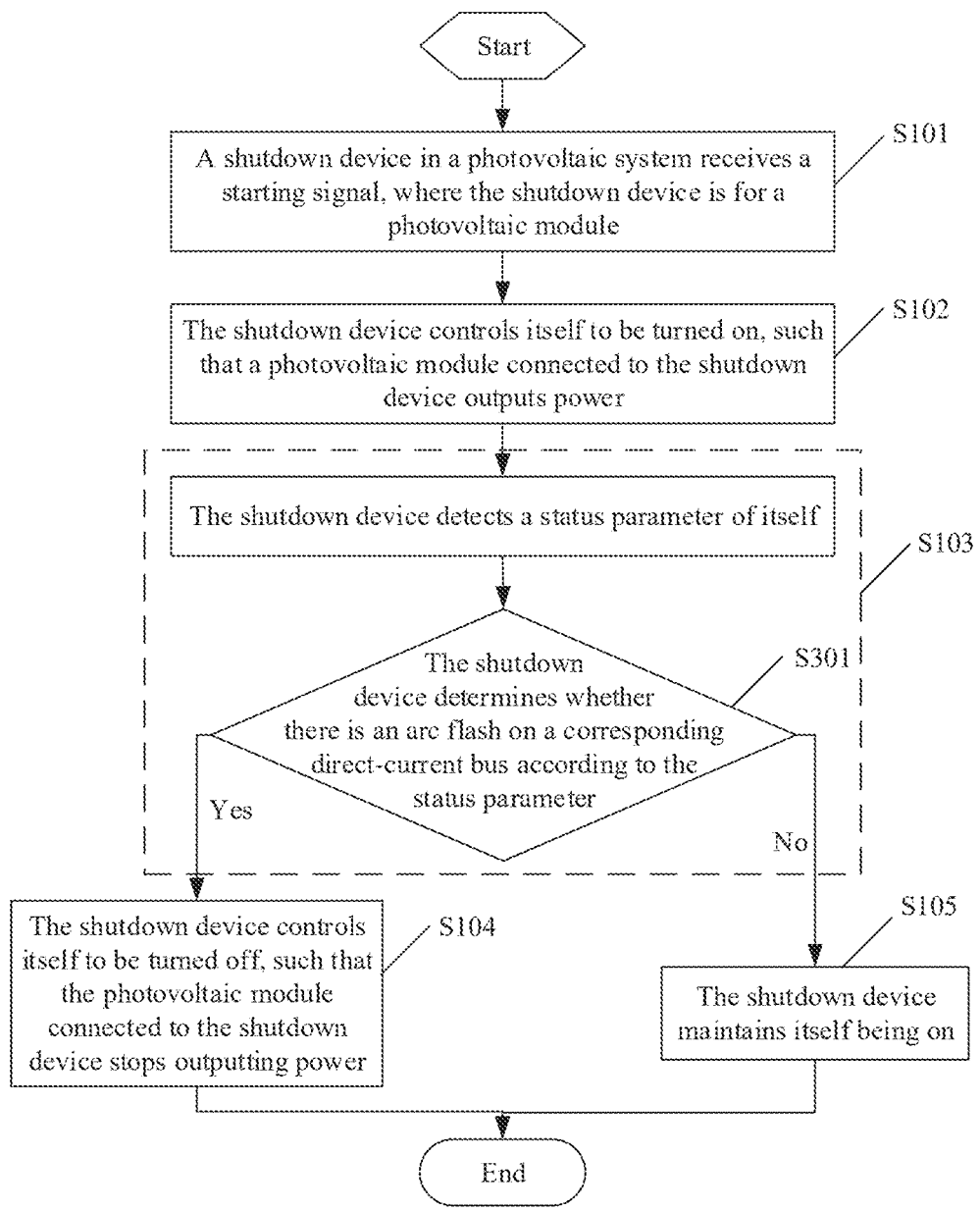
FIG. 3 is a flow chart of a rapid shutdown method according to another embodiment of the present disclosure.

(2) In practice, an arc flash on the direct-current bus may be detected in the inverter channel. In such case, the step S103 includes following step S301, as shown in FIG. 3.

In step S301, the shutdown device determines whether there is an arc flash on a direct-current bus corresponding to the shutdown device according to the status parameter.

The shutdown device determines whether there is the arc flash on the direct-current bus according to an input parameter of the shutdown device (that is, the voltage or the current outputted from the photovoltaic module). Specifically, whether there is the arc flash on the direct-current bus, i.e., the direct-current flash-arc fault, is mainly determined based on magnitude of current noise (noise in a current). It is determined that there is the arc flash on the direct-current bus, that is, there is the direct-current flash-arc fault, in a case that the magnitude of the current noise is greater than a preset value. It is determined that there is no arc flash on the direct-current bus, that is, there is no direct-current flash-arc fault, in a case that the magnitude of the current noise is less than or equal to the preset value.

It is determined that there is the fault in the inverter channel corresponding to the shutdown device, and the process goes to the step S104, in a case that there is the arc flash on the direct-current bus corresponding to the shutdown device. It is determined that there is no fault in the inverter channel corresponding to the shutdown device, and the process goes to the step S105, in a case that there is no arc flash on the direct-current bus corresponding to the shutdown device.

During operation of a photovoltaic system, the direct-current arc flash results in a sharp rise in temperature of a corresponding contact part. Continuous arc flashes would produce a high temperature ranging from 3000° C. to 7000° C., and surrounding devices are carbonized at such high temperature, causing hazards ranging from melted fuses and melted cables to burnt components and burnt devices and even to a fire disaster. The photovoltaic system would be subject to great safety risks in a case that the inverter is not provided with an arc-flash shutdown device or the arc-flash shutdown device malfunctions.

In this embodiment, it is determined whether there is the arc flash on the direct-current bus corresponding to the shutdown device based on the status parameter of the shutdown device. Thereby, the shutdown device controls itself to be turned off such that the photovoltaic module stops outputting power, in a case that there is the arc flash on the direct-current bus. Hence, avoided are great safety risks of the photovoltaic system due to the inverter not provided with an arc-flash shutdown device or malfunctions of the arc-flash shutdown device.

The steps S201 and S301 may be performed separately or in coordination, which depends on an actual situation. All implementations fall within the protection scope of the present disclosure.

Figure 11:
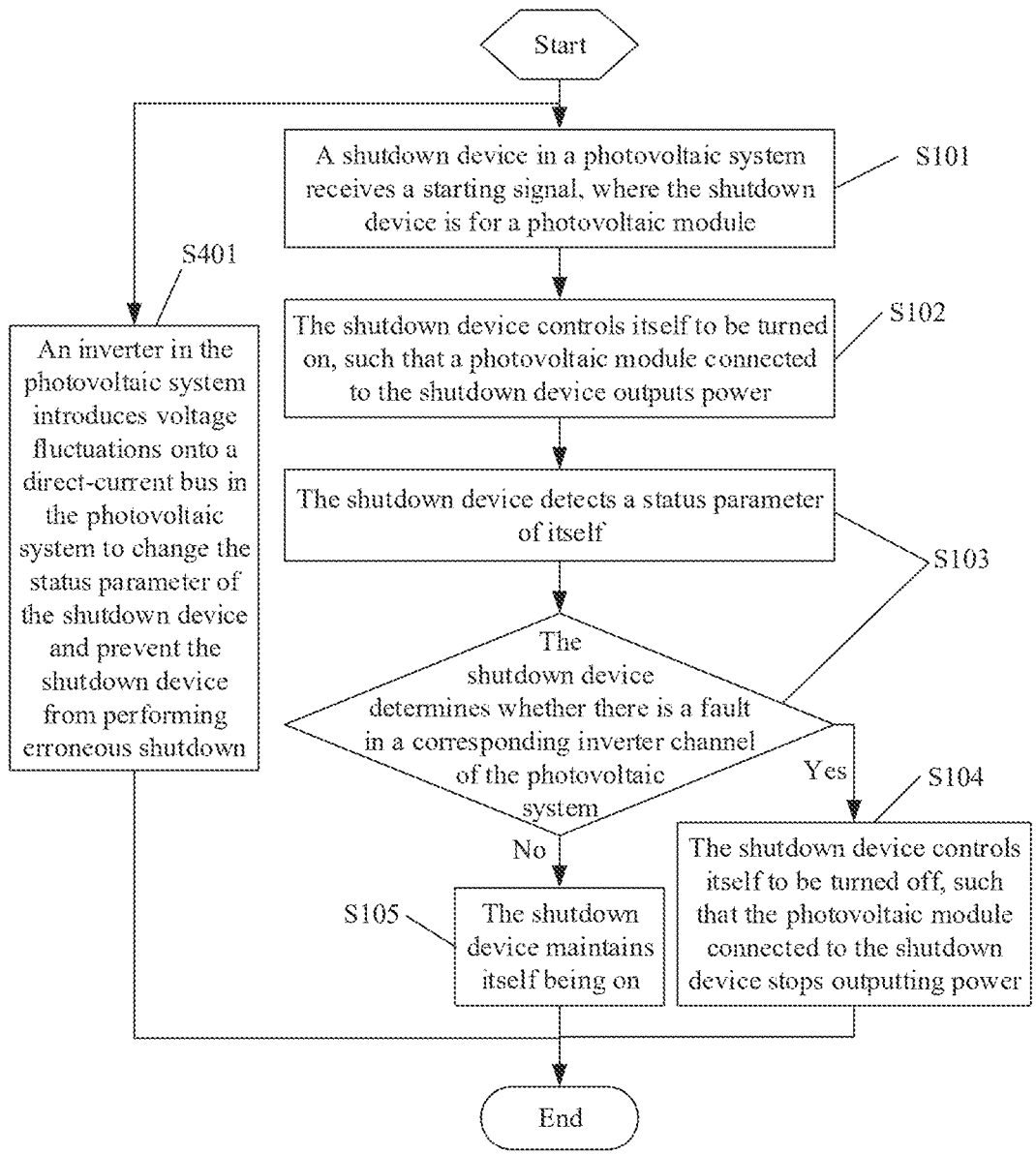
FIG. 11 is a schematic diagram of a shutdown device for a photovoltaic module according to another embodiment of the present disclosure.

Based on any foregoing embodiment, the method may further include step S401 as shown in FIG. 11 (which is depicted based on FIG. 1). In step S401, an inverter in the photovoltaic system introduces voltage fluctuations onto a direct-current bus in the photovoltaic system to change the status parameter of the shutdown device. Thereby, it is prevented that the shutdown device performs erroneous shutdown.

The inverter when operating keeps adjusting a voltage and a current of each direct-current bus in the photovoltaic system to perform the maximum power point tracking.

Figure 10:
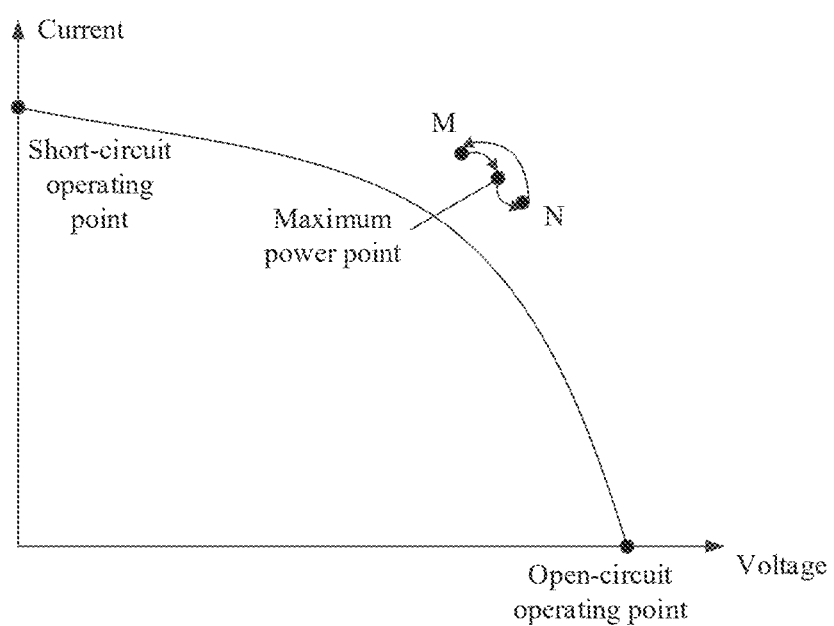
FIG. 10 is a schematic graph of a typical voltage-current curve of a photovoltaic module according to an embodiment of the present disclosure.

Reference is made to FIG. 10, which is a graph showing characteristics of a curve of an output voltage of a photovoltaic module with respect to an output current of the photovoltaic module. Typical operating points on the curve includes an open-circuit operating point, a short-circuit operating point, and a maximum power point. At the open-circuit operating point, the photovoltaic module outputs a maximum voltage, i.e., the open-circuit voltage, and zero current, and hence an output power of the photovoltaic module is zero. At the short-circuit operating point, photovoltaic module outputs zero voltage and a maximum current, i.e., the short-circuit current, and hence the output power of the photovoltaic module is zero. At the maximum power point, the photovoltaic module outputs the maximum-power-point voltage and the maximum-power-point current, and the output power of the photovoltaic module is maximum.

The inverter adjusts the voltage and the current of the direct-current bus dynamically to perform the maximum power point tracking, so as to maximize the output power of each photovoltaic module corresponding to the direct-current bus. Generally, the maximum power point tracking is implemented through a perturbation-and-observation method. The inverter introduces voltage fluctuations actively onto the direct-current bus to increase or decrease a voltage on the direct-current bus, determines the maximum power point according to the variations in the fluctuating voltage and variations in the fluctuating power, and controls an output of the direct-current bus to approximate the maximum power point. The output voltage and the output current of the photovoltaic module is subject to dynamic variations due to the maximum power point tracking of the inverter. When the operation point of the photovoltaic module has been stabilized, the output power of the photovoltaic module fluctuates around the maximum power point, for example, in a range between point M to point N.

In a case that a power grid side of the inverter fails or the inverter is halted under manual control, the photovoltaic module outputs the open-circuit voltage. In a case that there is a short-circuit fault on the input terminals of the inverter, the photovoltaic module outputs the short-circuit current. In a case that there is a short-circuit resistor on the direct-current bus, the operating state of the photovoltaic module corresponds to a specified voltage-current operating point. In any foregoing case, the shutdown device detects the fault in the system based on the status parameter of the shutdown device, that is, based on the inherent characteristic of the normal operation of the inverter. The shutdown device disconnects the corresponding photovoltaic module(s) after detecting the fault.

In some scenarios, the inverter is required to operate in a constant-power state. That is, the inverter does not perform the maximum power point tracking, and hence the voltage and the current on the direct-current bus are almost unchanged. In such case, the inverter may introduce transient voltage fluctuations actively onto the direct-current bus, such that the voltage and the current on the direct-current bus fluctuate, and the shutdown device maintains itself in an on-state. Thereby, it is prevented the shutdown device performs erroneous shutdown. In case of a weak sunlight, the photovoltaic module outputs a low current, and a current sampling module in the shutdown device may samples the current inaccurately due to a precision limit and a bias. In such case, the inverter may introduce transient voltage fluctuations onto the direct-current bus in a case that the photovoltaic module outputs a low power, in order to avoid erroneous determination of the shutdown device. Introduction of the voltage fluctuations includes the inverter increasing the output power suddenly, which results in a voltage drop on the direct-current bus, or the inverter decreasing the output power suddenly, resulting in a voltage rise on the direct-current bus. The above change in the output power is fast and has no significant impact on an average output power of the inverter.

In this embodiment, the inverter introduces the voltage fluctuations onto the direct-current bus in the photovoltaic system, even when the inverter operates in the constant-power state, that is, even when the inverter does not perform the maximum power point tracking. Hence, the status parameter of the shutdown device is varied, and it is prevented that the shutdown device performs erroneous shutdown due to the constant-power state of the inverter, which improves accuracy of diagnostic on derating due to rising temperature.

Figure 4:
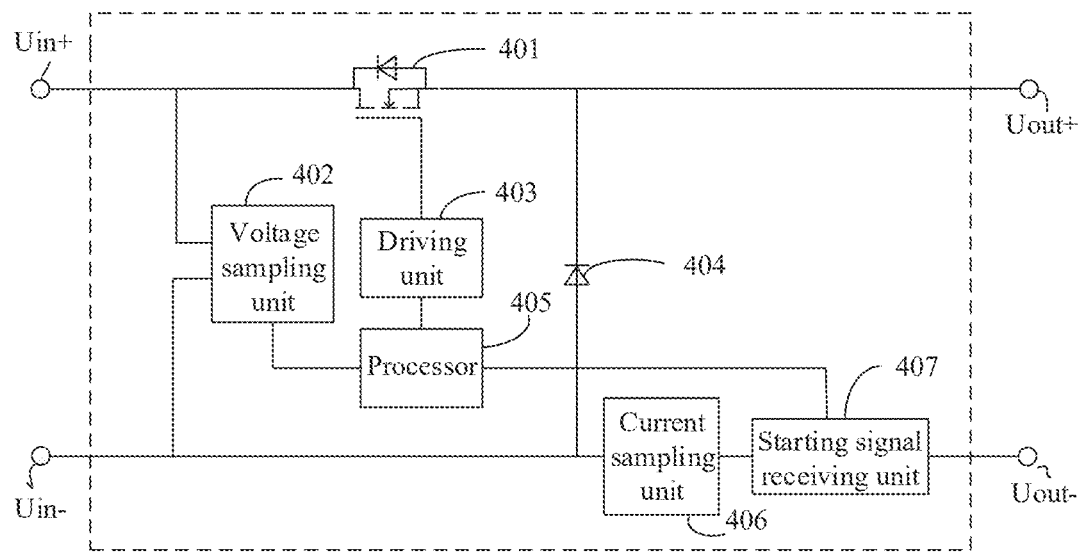
FIG. 4 is a schematic diagram of a shutdown device for a photovoltaic module according to an embodiment of the present disclosure.

A shutdown device is provided according to an embodiment of the present disclosure. Reference is made to FIG. 4. The shutdown device includes a switching unit 401, a bypass diode 404, a driving unit 403, a parameter collecting module (where the parameter collecting module as shown in FIG. 4 includes a voltage sampling unit 402 and a current sampling unit 406), a processor 405, and a starting signal receiving unit 407.

The parameter collecting module is configured to collect a status parameter of the shutdown device and report the collected status parameter to the processor 405.

The starting signal receiving unit 407 is connected in a negative branch of the shutdown device, and between an anode of the bypass diode 404 and a negative output terminal Uout− of the shutdown device. Specifically, a positive input terminal of the starting signal receiving unit 407 is connected to the negative output terminal Uout− of the shutdown device, and a negative input terminal of the starting signal receiving unit 407 is connected to a negative input terminal Uin− the shutdown device directly or via the parameter collecting module. The starting signal receiving unit 407 is configured to receive a starting signal and transmit the starting signal to the processor 405.

The switching unit 401 is connected in the negative branch (which is not shown), or alternatively in a positive branch of the shutdown device. As shown in FIG. 4, an input terminal of the switching unit 401 is connected to a positive input terminal Uin+ of the shutdown device, and an output terminal of the switching unit 401 is connected to a cathode of the bypass diode 404. A common terminal between the switching unit 401 and the bypass diode 404 is connected to a positive output terminal Uout+ of the shutdown device directly or via the parameter collecting module. The switching unit 401 is configured to turn on and turn off the shutdown device under control of the processor 405.

The switching unit 401 is a semiconductor switching device. That is, the switching unit 401 may be an insulated gate bipolar transistor (IGBT) or a metal-oxide-semiconductor field-effect transistor (MOSFET). The switching unit 401 may be formed by multiple semiconductor switching devices that are connected in series, in parallel, or in serial-parallel, which is not enumerated herein. All implementations fall within the protection scope of the present disclosure.

The anode of the bypass diode 404 is connected to the negative input terminal of the starting signal receiving unit 407 directly or through the parameter collecting module. The bypass diode 404 is configured to implement a bypass of the shutdown device when the shutdown device is turned off, that is, when the switching unit 401 is turned off.

An output terminal of the parameter collecting module and an output terminal of the starting signal receiving unit 407 each is connected to a corresponding input terminal of the processor 405. An output terminal of the processor 405 is connected to a control terminal of the switching unit 401 via the driving unit 403.

The shutdown device is configured to implement the rapid shutdown method according to any foregoing embodiment. Details of the shutdown device may refer to the foregoing embodiments, which are not repeated herein.

In this embodiment, the parameter collecting module collects the status parameter of the shutdown device, and the processor 405 determines whether there is a fault in an inverter channel in the photovoltaic system and controls the switching unit 401 to operate according to a result of the determination. Thereby, it is not necessary to perform the determination by transmitting a continuous heartbeat signal or analog pulses having a similar function, less software resources of the system are occupied, and power consumption of the system is reduced.

Figure 5:
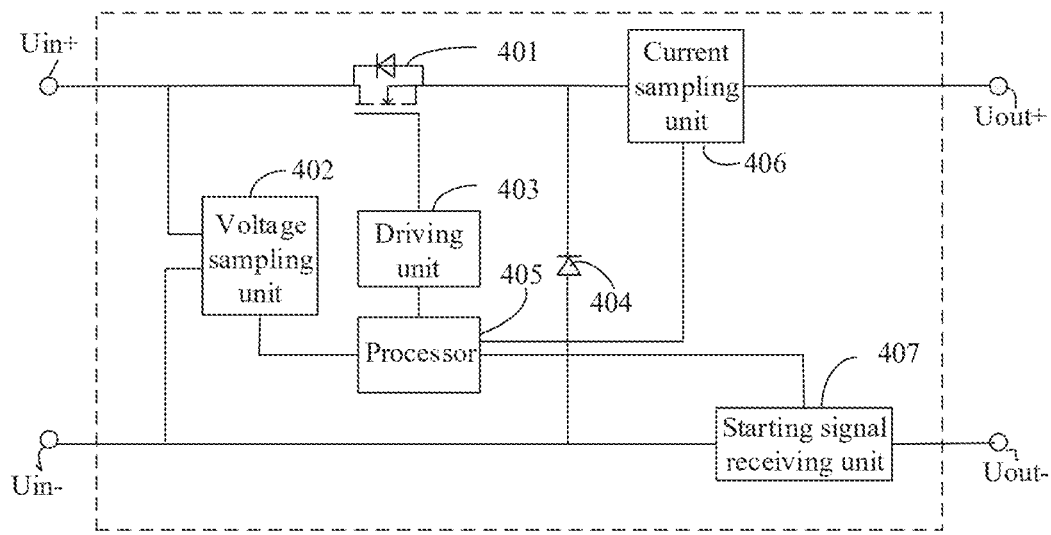
FIG. 5 is a schematic diagram of a shutdown device for a photovoltaic module according to another embodiment of the present disclosure.
Figure 6:
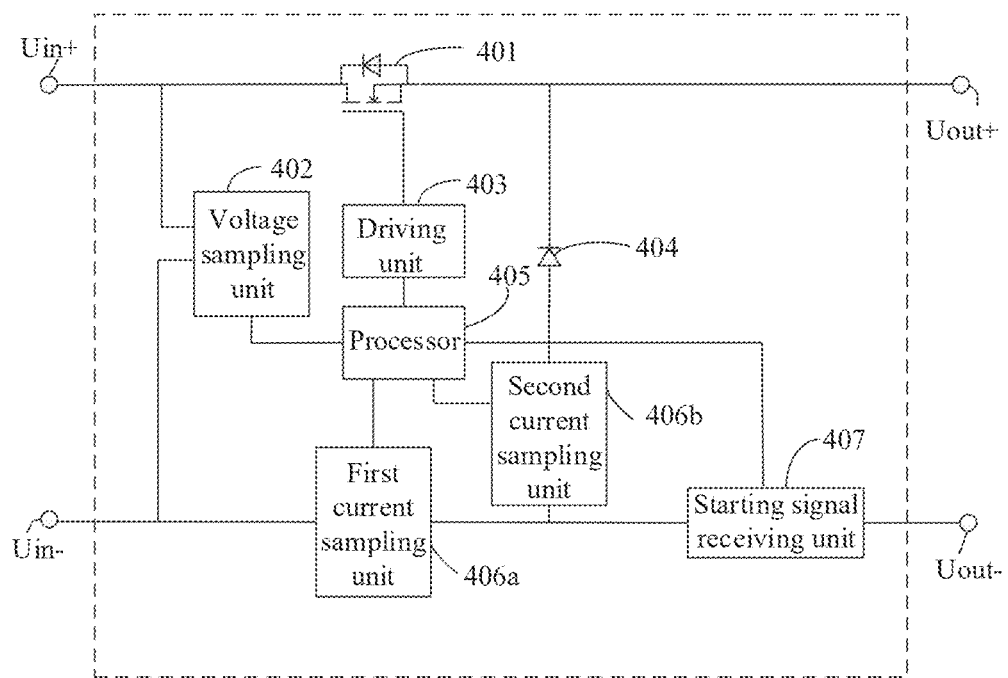
FIG. 6 is a schematic diagram of a shutdown device for a photovoltaic module according to another embodiment of the present disclosure.

In practice, the parameter collecting module includes the voltage sampling unit 402 and at least one current sampling unit (such as the current sampling unit 406 as shown in FIG. 4 and FIG. 5, or a first current sampling unit 406a and a second current sampling unit as 406b shown in FIG. 6).

A positive input terminal and a negative input terminal of the voltage sampling unit 402 are connected to the positive input terminal and the negative input terminal, respectively, of the shutdown device. An output terminal of the voltage sampling unit 402 is connected to the processor 405. The voltage sampling unit 402 is configured to collect an input voltage of the shutdown device and report the collected input voltage to the processor 405.

The current sampling unit is configured to collect an input current or an output current of the shutdown device, and report the collected input current or the collected output current to the processor 405. In practice, a quantity of the current sampling unit(s) may be one or two. Hereinafter cases of including one current sampling unit and including two current sampling units are respectively illustrated.

(1) The quantity of the current sampling unit is one. As shown in FIG. 5, the current sampling unit 406 is connected in the positive branch of the shutdown device, and between the cathode of the bypass diode 404 and the positive output terminal Uout+ of the shutdown device. An output terminal of the current sampling unit 406 is connected to the processor 405. Specifically, a terminal of the current sampling unit 406 is connected to the output terminal of the switching unit 401 and the cathode of the bypass diode 404, and another terminal of the current sampling unit 406 is connected to the positive output terminal Uout+ of the shutdown device. Alternatively, as shown in FIG. 4, the current sampling unit 406 is connected in the negative branch of the shutdown device, and between the anode of the bypass diode 404 and the starting signal receiving unit 407. A terminal of the current sampling unit 406 is connected to the negative input terminal of the starting signal receiving unit 407, and another terminal of the current sampling unit 406 is connected to the anode of the bypass diode 404 and the negative input terminal Uin− of the shutdown device.

In a case that the switching unit 401 is turned on, the bypass diode 404 is cut off, and the current sampling unit 406 collects an output current of the photovoltaic module, which is also an input current of the shutdown device. In a case that the switching unit 401 is turned off, the current sampling unit 406 collects a current flowing through the bypass diode 404, which is an output current of the shutdown device.

(2) The quantity of the current sampling unit is two. As shown in FIG. 6, the first current sampling unit 406a is connected in the negative branch of the shutdown device, and between the negative input terminal Uin− of the shutdown device and the starting signal receiving unit 407. The second current sampling unit 406b is arranged between the anode of the bypass diode 404 and a common terminal between the first current sampling unit 406a and the starting signal receiving unit 407. An output terminal of the first current sampling unit 406a and an output terminal of the second current sampling unit 406b are connected to the processor 405. Specifically, a terminal of the second current sampling unit 406b is connected to the anode of the bypass diode 404, another terminal of the second current sampling unit 406b is connected to a terminal of the first current sampling unit 406a and a negative input terminal of the starting signal receiving unit 407, and another end of the first current sampling unit 406a is connected to the negative input terminal Uin− of the shutdown device.

The first current sampling unit 406a is configured to sample the output current of the photovoltaic module, which is the input current of the shutdown device. The second current sampling unit 406b is configured to sample the current flowing through the bypass diode 404, which may be the output current of the shutdown device.

The foregoing current sampling unit may be a current sensor or another device capable of sampling a current, which is not enumerated herein. All implementations fall within the protection scope of the present disclosure.

In an embodiment, the voltage sampling module and the current sampling module may detect a direct-current arc at a side of the photovoltaic module. Such detection may be configured to distinguish a parallel-connection arc-flash faut in the system.

Figure 7:
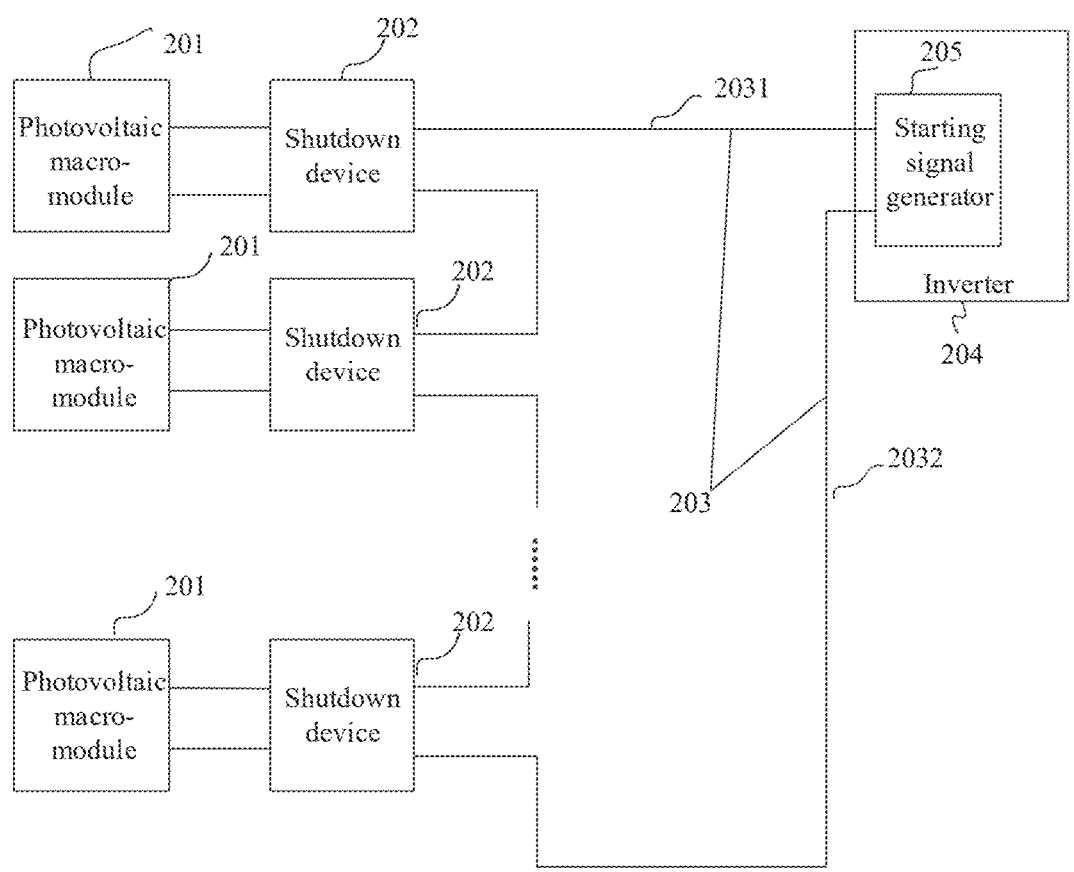
FIG. 7 is a schematic diagram of a photovoltaic system according to an embodiment of the present disclosure.

A photovoltaic system is provided according to embodiments of the present disclosure. As shown in FIG. 7 (which takes one shutdown system as an example), the photovoltaic system includes at least one shutdown system and at least one inverter 204. The shutdown system includes a direct-current bus 203, a starting signal generator 205, N photovoltaic macro-modules 201, and N shutdown devices 202. N is a positive integer.

In the shutdown system, the N shutdown devices 202 are cascaded via output terminals of the N shutdown devices, and are connected to the N photovoltaic macro-modules 201 in one-to-one correspondence via input terminals of the N shutdown devices. A positive terminal of the cascaded shutdown devices 202 is connected to a positive terminal of a corresponding direct-current interface of the inverter 204 via a positive line 2031 of the direct-current bus. A negative terminal of the cascaded shutdown devices 202 is connected to a negative terminal of the corresponding direct-current interface of the inverter 204 via a negative line 2032 of the direct-current bus.

Figure 8:
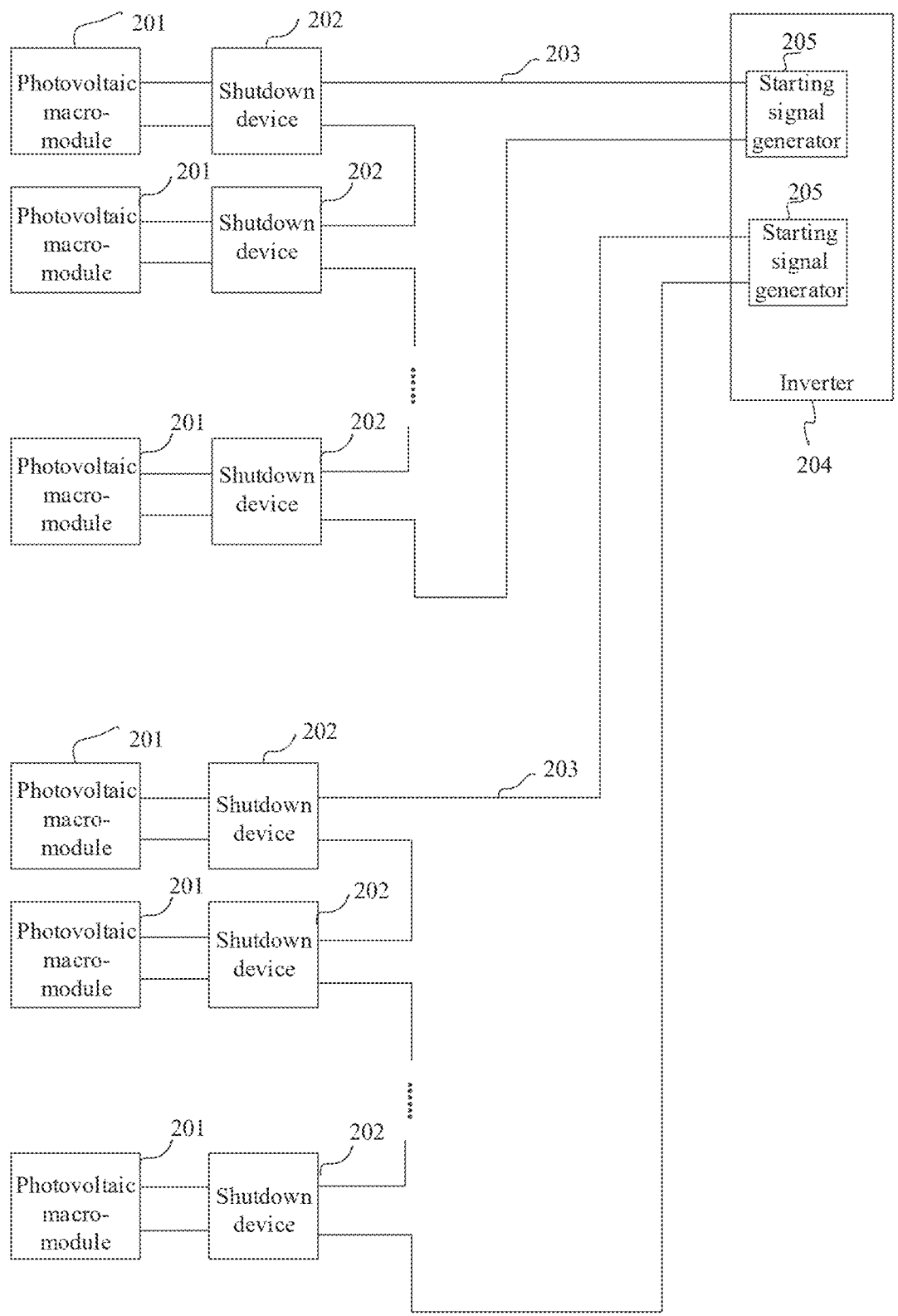
FIG. 8 is a schematic diagram of a photovoltaic system according to another embodiment of the present disclosure.
Figure 9:
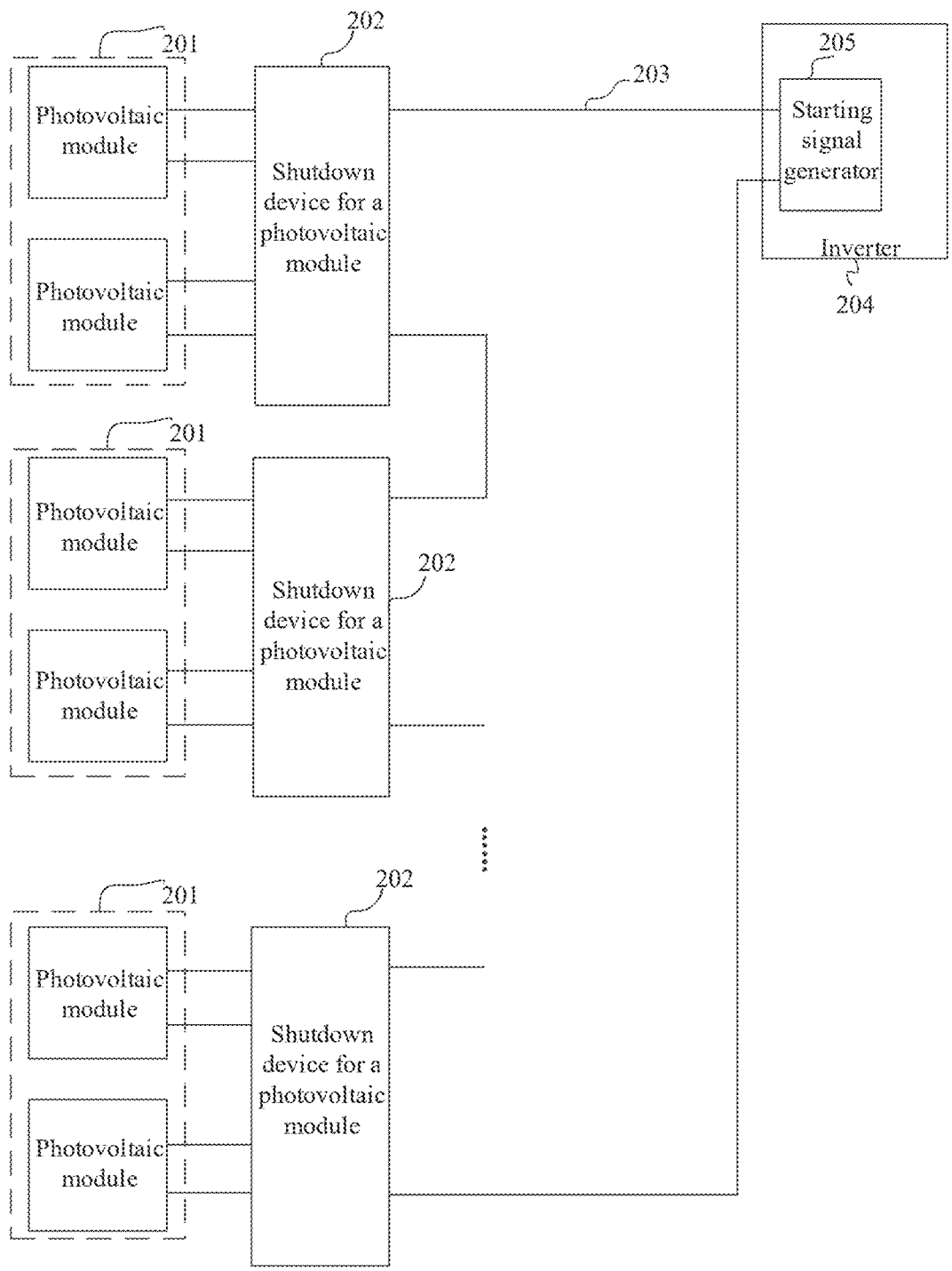
FIG. 9 is a schematic diagram of a photovoltaic system according to another embodiment of the present disclosure.

Each photovoltaic macro-module 201 includes at least one photovoltaic module. In a case that there is only one photovoltaic module in the photovoltaic macro-module 201, such photovoltaic macro-module 210 can be treated as the photovoltaic module. A structure of the photovoltaic macro-module 201 may refer to FIG. 7 and FIG. 8. In a case that there are two photovoltaic modules in the photovoltaic macro-module 201, a structure of the photovoltaic macro-module 201 may refer to FIG. 9. Other specific structures of the photovoltaic macro-module 201 are not enumerated herein, and all implementations fall within the protection scope of the present disclosure. FIG. 8 shows a structure of a photovoltaic system in which a quantity of the photovoltaic systems is two. FIGS. 7 and 9 show structures of a photovoltaic system in which a quantity of the photovoltaic system is one. Other structures of the photovoltaic system are not enumerated herein, and all implementations fall within the protection scope of the present disclosure.

In the shutdown system, a positive output terminal of a first shutdown device 202 is connected to the positive line 2031 of the direct-current bus, a negative output terminal of the first shutdown device 202 is connected to a positive output terminal of a second shutdown device 202, a negative output terminal of the second shutdown device 202 is connected to a positive output terminal of a third shutdown device 202, so the forth, a positive output terminal of an N-th shutdown device 202 is connected to a negative output terminal of an (N−1)th shutdown device 202, and a negative output terminal of the N-th shutdown device 202 is connected to the negative line 2032 of the direct-current bus.

The shutdown device 202 being turned on enables the photovoltaic macro-module 201 connected to it to output power, and in such case a voltage on the direct-current bus 203 is high. The shutdown device 202 being turned off stops the photovoltaic module 201 connected to it outputting power, and in such case the voltage on the direct-current bus 203 is low. When all shutdown devices 202 are turned off, the voltage on the direct-current bus 203 is within a safety range, which is generally less than 30V, to avoid devices in the photovoltaic system being damaged due to overvoltage.

An operation process and a structure of the shutdown device 202 may refer to the shutdown device 202 according to any forgoing embodiment, and are not repeated herein.

The starting signal generator 205 is configured to transmit a starting signal to each shutdown device 202 in the same shutdown system as the starting signal generator 205.

In practice, the starting signal may be a power-line-carrier signal, a wireless communication signal, or an analog pulse signal. In a case that the starting signal is the power-line-carrier signal, the starting signal complies with a rapid shutdown signal specification issued by SunSpec Alliance.

The starting signal generator 205 is integrated into the inverter 204 (as shown in FIG. 7 to 9), or independently connected in the direct-current bus 203 (which is not depicted). In a case that the starting signal generator 205 is integrated into the inverter 204, the starting signal generator 205 is powered by the inverter 204. In a case that the starting signal generator 205 is independently connected in the direct-current bus 203, the starting signal generator 205 is powered by another non-photovoltaic power source, for example, by a power grid at the alternating-current side or a battery in an energy storage system.

When the starting signal generator 205 transmits the starting signal to each shutdown devices 202 in the shutdown system corresponding to the starting signal generator, there may be a shaded photovoltaic macro-module 201 that cannot output a voltage, and hence the shutdown device 202 connected to the such photovoltaic macro-module has no assistant power and cannot be started. In such case, before turning itself on, the shutdown device 202 should wait until the photovoltaic macro-module 201 outputs power, that is, until having the assistant power. Since the starting signal generator 205 does not transmit the starting signal(s) successively, the shutdown device 202 may sample the status parameter of itself via the built-in parameter collecting module, and then determines whether the inverter 204 is operating according to the status parameter and an operating characteristic that the inverter 204 adjusts a voltage and a current of the direct-current bus 203 actively. The shutdown device 202 control itself to be turned on when the inverter 204 is operating, such that the photovoltaic module 201 connected to the shutdown device outputs power.

In some scenarios, the inverter 204 is required to have a fault-recovery period, which generally ranges from tens of seconds to a few minutes. The fault-recovery period is greater than a rapid shutdown period required by the photovoltaic system, for example, 30 seconds specified in the standard NEC 2017. After the starting signal generator 205 transmits the starting signal to each shutdown device 202 in the same shutdown system as the starting signal generator 205, each photovoltaic macro-module 201 outputs power, a direct-current input voltage of the inverter 204 is normal, such that an undervoltage input fault disappears. At such time, the inverter should wait the fault-recovery period before being started. During the fault-recovery period, the photovoltaic module is open-circuit. In order to maintain the direct-current input voltage being normal, the starting signal generator 205 is required to transmit successive starting signals to each shutdown device 202 in the same shutdown system as the starting signal generator 205 during the fault-recovery period, until the inverter 204 is started.

Specifically, the starting signal generator 205 transmits the starting signal(s) successively to each shutdown device 202 in such shutdown system during the starting period of said shutdown device 202, or during the fault-recovery period of the inverter 204 until the inverter 204 is operates normally.

The assistant power for the inverter 204 comes from a non-photovoltaic power source, such as a power grid at the alternating-current side or a battery in an energy storage system.

An operation process of the inverter 204 is as follows. The inverter 204 determines whether the photovoltaic system is ready, for example, based on whether a voltage of a power grid is normal, whether a frequency of the power grid is normal, whether grounding impedance is normal, whether the photovoltaic system is shut down under remote control, or whether a rapid shutdown key is manually activated. After detecting that the system is ready, the inverter 204 instructs the starting signal generator 205 to transmit the starting signal to each shutdown devices 202 in the same shutdown system as the starting signal generator 205. After each shutdown device 202 is started, the inverter 204 starts to output power, that is, to invert power from photovoltaic modules to the power grid. When detecting that the system is abnormal, the inverter 204 stops outputting power and terminates maximum power point tracking through the direct-current bus 203. The inverter 204 keeps adjusting the voltage and the current of the direct-current bus 203 to perform the maximum power point tracking. In addition, the inverter 204 may adjust the voltage and the current on the direct-current bus 203 actively, especially when the inverter 204 operates in a constant-power state. The active adjustment of the voltage and the current on the direct-current bus 203 can keeps the status parameter of the shutdown device varying to prevent the shutdown device from performing erroneous shutdown. In a case that the photovoltaic system includes multiple direct-current buses, the inverter 204 may adjust the voltage and the current of each direct-current bus connected to the inverter 204 actively, a process of which is not described in detail herein. All implementations fall within the protection scope of the present disclosure.

The inverter 204 and the shutdown device 202 are configured to perform the rapid shutdown method according to the foregoing embodiments. Details may refer to the foregoing embodiments, and are not repeated herein.

In an embodiment, after the shutdown device 202 is started, the maximum power point tracking during normal operation of the inverter 204 leads to successive fluctuations in output of each photovoltaic module, and such inherent characteristic is utilized to determine whether there is a fault in the photovoltaic system. Hence, it is not necessary to transmit a continuous heartbeat signal or analog pulses having a similar function to implement such determination. Less software resources in the system are occupied, and power consumption of the system is reduced.

The embodiments of the present disclosure are described in a progressive manner, and each embodiment places emphasis on the difference from other embodiments. Therefore, one embodiment can refer to other embodiments for the same or similar parts. Since the systems disclosed in the embodiments corresponds to the methods disclosed in the embodiments, the description of the systems is simple, and reference may be made to the relevant part of the methods. The systems described in the foregoing embodiments are only schematic. A unit described as separated components may or may not be physically separated, and components depicted as units may or may not be physical, that is, the components may be located in one place or may be distributed among multiple network units. Some or all modules herein may be selected based on an actual requirement to implement an objective of the solution in the embodiments. Those skilled in the art can understand and implement the modules without any creative effort.

As further be appreciated by those skilled in the art, the units and algorithmic steps in the examples described according to the embodiments disclosed herein can be implemented in forms of electronic hardware, computer software or the combination of the both. To illustrate the interchangeability of the hardware and the software clearly, the components and the steps in the examples are described generally according to functions in the above description. Whether hardware or software is used to implement the functions depends on a specific application and design constraints for the technical solution. For each specific application, different methods may be used by those skilled in the art to implement the described function, and such implementation should not be considered to depart from the scope of this invention.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but conforms to a widest scope in accordance with principles and novel features disclosed in the present disclosure.

The invention claimed is:

1. A rapid shutdown method, comprising:
receiving a starting signal by a shutdown device in a photovoltaic system, wherein the shutdown device is for a photovoltaic module;
controlling, by the shutdown device, the shutdown device to be turned on, wherein the shutdown device being on enables the photovoltaic module connected to the shutdown device to output power;
determining, by the shutdown device, whether there is a fault in an inverter channel of the photovoltaic system through detecting a status parameter of the shutdown device, wherein the inverter channel corresponds to the shutdown device;
controlling, by the shutdown device, the shutdown device to be turned off in response to there being the fault in the inverter channel, wherein the shutdown device being off stops the photovoltaic module connected to the shutdown device outputting power; and
maintaining, by the shutdown device, the shutdown device being on, in response to there being no fault in the inverter channel;
wherein determining, by the shutdown device, whether there is the fault in the inverter channel in the photovoltaic system comprises:
determining, by the shutdown device, whether the status parameter is subject to dynamic variations;
determining, by the shutdown device, that there is no fault in the inverter channel in response to the status parameter being subject to the dynamic variations; and
determining, by the shutdown device, that there is the fault in the inverter channel in response to the status parameter being not subject to dynamic variations.

2. The rapid shutdown method according to claim 1, wherein determining, by the shutdown device, whether there is the fault in the inverter channel in the photovoltaic system comprises:
   determining, by the shutdown device according to the status parameter, whether there is an arc flash on a direct-current bus corresponding to the shutdown device;
   determining, by the shutdown device, that there is the fault in the inverter channel in response to there being the arc flash on the direct-current bus; and
   determining, by the shutdown device, that there is no fault in the inverter channel in response to there being no arc flash on the direct-current bus.

3. The rapid shutdown method according to claim 1, wherein receiving the starting signal by the shutdown device in the photovoltaic system comprises:
   receiving, by the shutdown device, the starting signal during a starting period of the shutdown device or during a fault-recovery period of an inverter.

4. The rapid shutdown method according to claim 3, wherein:
   the starting signal is received during the starting period of the shutdown device, and
   before controlling, by the shutdown device, the shutdown device to be turned on, the method further comprises:
   determining, by the shutdown device, whether the inverter is operating through detecting an output current of the shutdown device, after the shutdown device is powered by an assistant power supply; and
   controlling, by the shutdown device, the shutdown device to be turned on in response to the inverter being operating and the shutdown device receiving the starting signal.

5. The rapid shutdown method according to claim 1, wherein controlling, by the shutdown device, the shutdown device to be turned off comprises:
   determining, by the shutdown device, whether duration for which the fault in the inverter channel lasts reaches preset duration; and
   controlling, by the shutdown device, the shutdown device to be turned off, in response to the duration for which the fault lasts reaching the preset duration.

6. The rapid shutdown method according to claim 5, wherein:
   the preset duration is longer than a time step for maximum power point tracking of an inverter in the photovoltaic system, and is less than duration required for rapid shutdown of the photovoltaic system.

7. The rapid shutdown method according to claim 1, further comprising:
   introducing, by an inverter in the photovoltaic system, voltage fluctuations onto a direct-current bus in the photovoltaic system, wherein the dynamic variations of the status parameter are caused by the voltage fluctuations when there is no fault in the inverter channel.

8. A shutdown device for a photovoltaic module, comprising a switching unit, a bypass diode, a driving unit, a parameter collecting module, a processor, and a starting signal receiving unit, wherein:
   the parameter collecting module is configured to collect a status parameter of the shutdown device and report the collected status parameter to the processor;
   the starting signal receiving unit is configured to receive a starting signal and transmit the starting signal to the processor;
   the switching unit is connected in a positive branch or a negative branch of the shutdown device, and is configured to turn on and turn off the shutdown device under control of the processor;
   the bypass diode is configured to implement a bypass of the shutdown device when the shutdown device is turned off;
   an output terminal of the processor is connected to a control terminal of the switching unit via the driving unit; and
   the processor is configured to coordinate with the starting signal receiving unit, the parameter collecting module, the driving unit, and the switching unit to enable the shutdown device to perform the rapid shutdown method according to claim 1.

9. The shutdown device according to claim 8, wherein:
   the parameter collecting module comprises a voltage sampling unit and at least one current sampling unit;
   the voltage sampling unit is configured to collect an input voltage of the shutdown device and report the collected input voltage to the processor; and
   each of the at least one current sampling unit is configured to collect an input current or an output current of the shutdown device and report the collected input current or the collected output current to the processor.

10. The shutdown device according to claim 9, wherein:
    the starting signal receiving unit is connected in the negative branch of the shutdown device, and between an anode of the bypass diode and a negative output terminal of the shutdown device;
    a quantity of the at least one current sampling unit is one; and
    the current sampling unit is connected in the positive branch of the shutdown device and between a cathode of the bypass diode and a positive output terminal of the shutdown device, or is connected in the negative branch of the shutdown device and between the anode of the bypass diode and the starting signal receiving unit.

11. A photovoltaic system, comprising at least one shutdown system and at least one inverter, wherein each of the at least one shutdown system comprises:
    a direct-current bus;
    a starting signal generator;
    N photovoltaic macro-modules, N being a positive integer; and
    N shutdown devices, each of which is the shutdown device according to claim 8,
    wherein in each of the at least one shutdown system:
    the N shutdown devices are cascaded via output terminals of the N shutdown devices, and are connected to the N photovoltaic macro-modules in a one-to-one correspondence via input terminals of the N shutdown devices;
    a positive terminal of the cascaded shutdown devices is connected to a positive terminal of a corresponding direct-current interface of an inverter of the at least one inverter via a positive line of the direct-current bus, and a negative terminal of the cascaded shutdown devices is connected to a negative terminal of the direct-current interface of the inverter via a negative line of the direct-current bus; and
    the starting signal generator is configured to transmit a starting signal to each of the N shutdown devices.

12. The photovoltaic system according to claim 11, wherein the starting signal generator is configured to:

transmit the starting signal successively to each of the N shutdown devices during a starting period of said shutdown device, or during a fault-recovery period of the inverter until the inverter enters a normal operating state.

13. The photovoltaic system according to claim 11, wherein the at least one inverter is configured to:
introduce voltage fluctuations onto the direct-current bus to change a status parameter of each shutdown device corresponding to the direct-current bus dynamically.

14. The photovoltaic system according to claim 11, wherein the starting signal is a power-line-carrier signal, a wireless communication signal, or an analog pulse signal.

15. The photovoltaic system according to claim 11, wherein:
the starting signal generator is integrated in the inverter, or is independently connected in the direct-current bus.

16. The shutdown device according to claim 9, wherein:
the starting signal receiving unit is connected in the negative branch of the shutdown device, and between an anode of the bypass diode and a negative output terminal of the shutdown device;
a quantity of the at least one current sampling unit is two, and the at least one current sampling unit comprises a first current sampling unit and a second current sampling unit;
the first current sampling unit is connected in the negative branch of the shutdown device and between a negative input terminal of the shutdown device and the starting signal receiving unit; and
the second current sampling unit is connected between the anode of the bypass diode and a common terminal between the first current sampling unit and the starting signal receiving unit.

* * * * *